United States Patent [19]

Dhuey et al.

[11] Patent Number: 4,774,652
[45] Date of Patent: Sep. 27, 1988

[54] MEMORY MAPPING UNIT FOR DECODING ADDRESS SIGNALS

[75] Inventors: Michael J. Dhuey, Cupertino; Ronald R. Hochsprung, Saratoga, both of Calif.

[73] Assignee: Apple Computer, Inc., Cupertino, Calif.

[21] Appl. No.: 15,907

[22] Filed: Feb. 18, 1987

[51] Int. Cl.⁴ ............................................. G06F 12/00
[52] U.S. Cl. ..................................................... 364/200
[58] Field of Search ................................. 364/200, 900

[56] References Cited

U.S. PATENT DOCUMENTS 4,484,263  11/1984  Olson et al. ..................... 364/200

FOREIGN PATENT DOCUMENTS 0132129  7/1984  European Pat. Off. .
0205692  6/1985  European Pat. Off. .
0223551  11/1986  European Pat. Off. .

OTHER PUBLICATIONS

"MC68851 Page Memory Management Unit User's Manual"; Motorola; Prentice-Hall; 1986.

*Primary Examiner*—Raulfe B. Zache
*Attorney, Agent, or Firm*—Blakely, Sokoloff, Taylor & Zafman

[57] ABSTRACT

A memory mapping unit which permits a computer to run programs designed to provide 32-bit or 24-bit address signals to address a 32-bit addressable memory. When a CPU generates a 32-bit address, that address is passed through to provide a 32-bit physical address. However, when the CPU generates a 24-bit address, the most significant bits are processed by the memory mapping unit to provide a remapped 32-bit physical address. The memory mapping unit is implemented on a single semiconductor chip using gate-array technology.

16 Claims, 5 Drawing Sheets

MEMORY MAPPING UNIT FOR DECODING ADDRESS SIGNALS

BACKGROUND OF THE INVENTION

1. Field of the Invention

The present invention relates to the field of computer memory management units, and more specifically, to mapping less than 32 bits onto a 32-bit memory address bus.

2. Prior Art

In most computers, a central processing unit (CPU) communicates directly with both an address bus and a data bus. These buses are coupled to a memory system in addition to numerous other items, such as input/output ports, specialized processors, DMA units, etc. The new generation of microcomputers of today utilized single chip CPUs such as the 8086, 80386, 68000 and 68020. More recent chips, such as the 80386 and the 68020 utilize 32 bit address signals to access various locations within the memory.

Memory management units are well-known in the prior art and are used to provide efficient utilization of the computer's main memory. These units perform housekeeping functions, such as remapping, and often include a memory which stores data containing relocation of an address base and providing paging functions. Because of the complexity of present day CPU chips, more complex memory management units are provided to perform extensive and complicated memory management functions. One such chip is the 68851 paged memory management unit by Motorola Inc. to support the 68020 chip.

However, until the advent of the 32-bit microprocessor chips the earlier CPUs operated on 16-bit and 24-bit addressing schemes. Considerable software, including operating systems, have been written to run on these prior art 16-bit and 24-bit computers. Prior art memory management units operating in conjuction with these earlier CPUs are not able to provide the extended addressing bit capability of the new 32-bit processors. Although 32-bit memory management units are available, such as the aforementioned 68851, such units are very complex, costly and provide significantly more complex functions than the basic memory remapping which is required to convert the prior art 16-bit and 24-bit address ranges into a 32-bit address map.

For example, the Macintosh TM computer sold by Apple Computer Inc. of Cupertino, Calif., provided a 24-bit address scheme, wherein 24 bits physically addressed the memory. A newer computer operating on the 68020 CPU is now capable of addressing considerable more memory space due to its 32-bit address configuration. However, to run the earlier software written for the 24-bit machine, the 32-bit system must be capable of converting the 24-bit address range of the older system to a 32-bit address range of the newer computer system. Although other memory management units are capable of performing this function, the memory remapping of 24 to 32 bits can be accomplished much more simply and economically with the present invention.

The present invention builds upon those prior art memory management units, as well as the more recent 32-bit memory management units. The memory mapping unit of the present invention is simplistic in design and function and is economical from a cost stand point. The memory mapping unit of the present invention is capable of providing a 32-bit address range to physically access the memory by using the more recent 32-bit addressing scheme, or alternatively, converting the prior art address scheme having less than 32 bits to a 32-bit address.

SUMMARY OF THE INVENTION

The present invention describes an apparatus for permitting a 32 address bit CPU and main memory to run 24 address bit programs. A memory mapping unit (MMU) of the present invention is placed between the CPU and the main memory. Whenever the CPU runs programs designed to generate 32-bit addresses for accessing main memory, the MMU permits the address signal to pass without remapping. However, whenever the CPU runs programs designed to generate 24-bit addresses, the MMU converts the 24 bits and provides a 32-bit physical address signal. The remapping is essential because equivalent tasks of each program need to access equivalent areas of memory.

The MMU as implemented in the preferred embodiment processes the four most significant bits of the 24-bit address signal and generates the twelve most significant bits of the 32-bit physical address signal. Further, the processing is achieved using combinatorial logic implemented in gate-array technology.

BRIEF DESCRIPTION OF THE DRAWINGS

FIG. 2b shows the upper right quadrant of the mapping circuit.

DETAILED DESCRIPTION OF THE INVENTION

A memory mapping unit is described for use in a digital computer which includes a central processing unit (CPU) and a main memory. In the following description, numerous specific details are set forth such as specific memory sizes, part numbers, circuits, etc., in order to provide a thorough understanding of the present invention. However, it will be obvious to one skilled in the art that the present invention may be practiced without these specific details. In other instances, well-known structures and circuits are not described in detail in order not to unnecessarily obscure the present invention.

Figure 1:
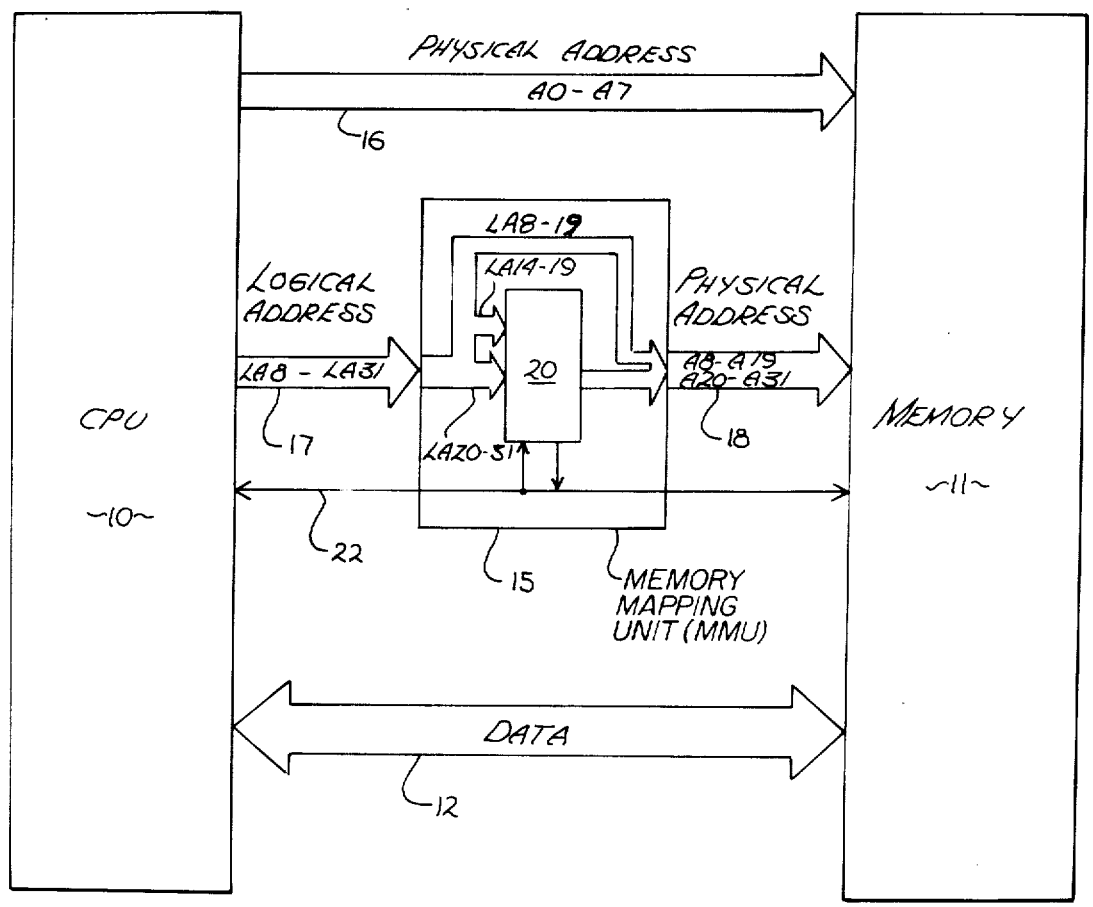
FIG. 1 is a block digram showing the various disposition of address signals processed by the memory mapping unit of the present invention.
Figure 2A:
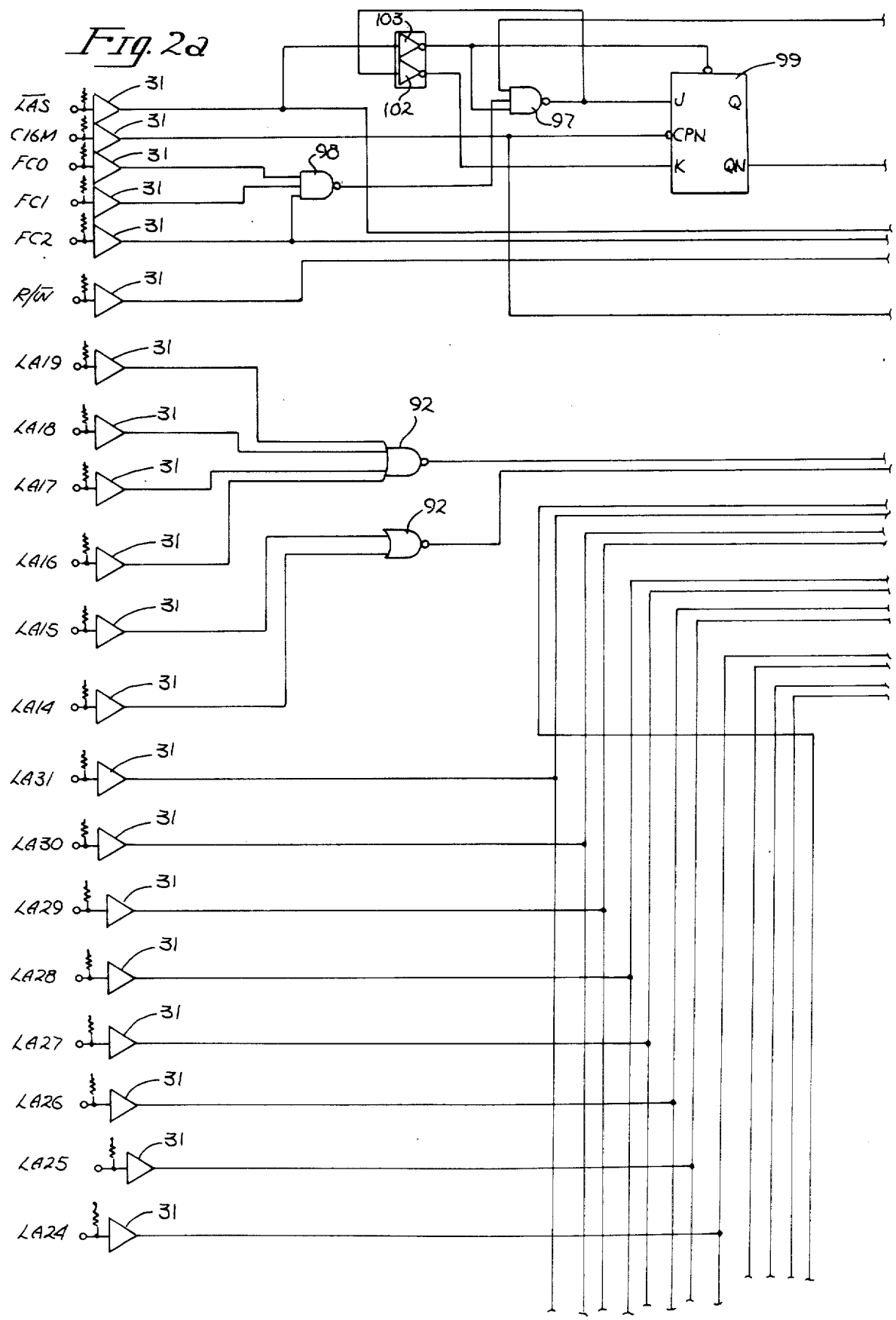
FIG. 2a is a schematic diagram showing the upper left quadrant of a mapping circuit of the preferred embodiment.
Figure 26:
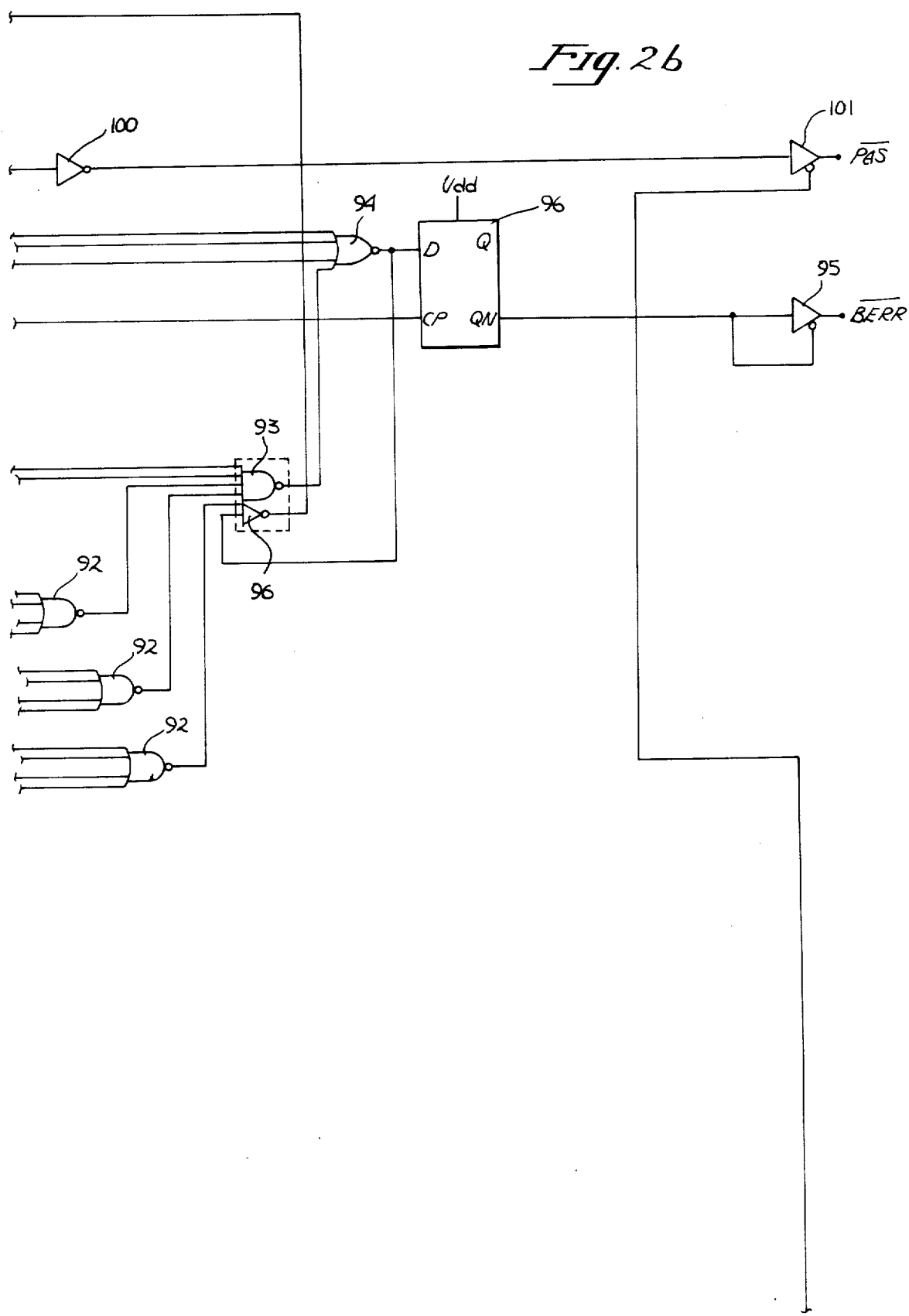
Figure 2C:
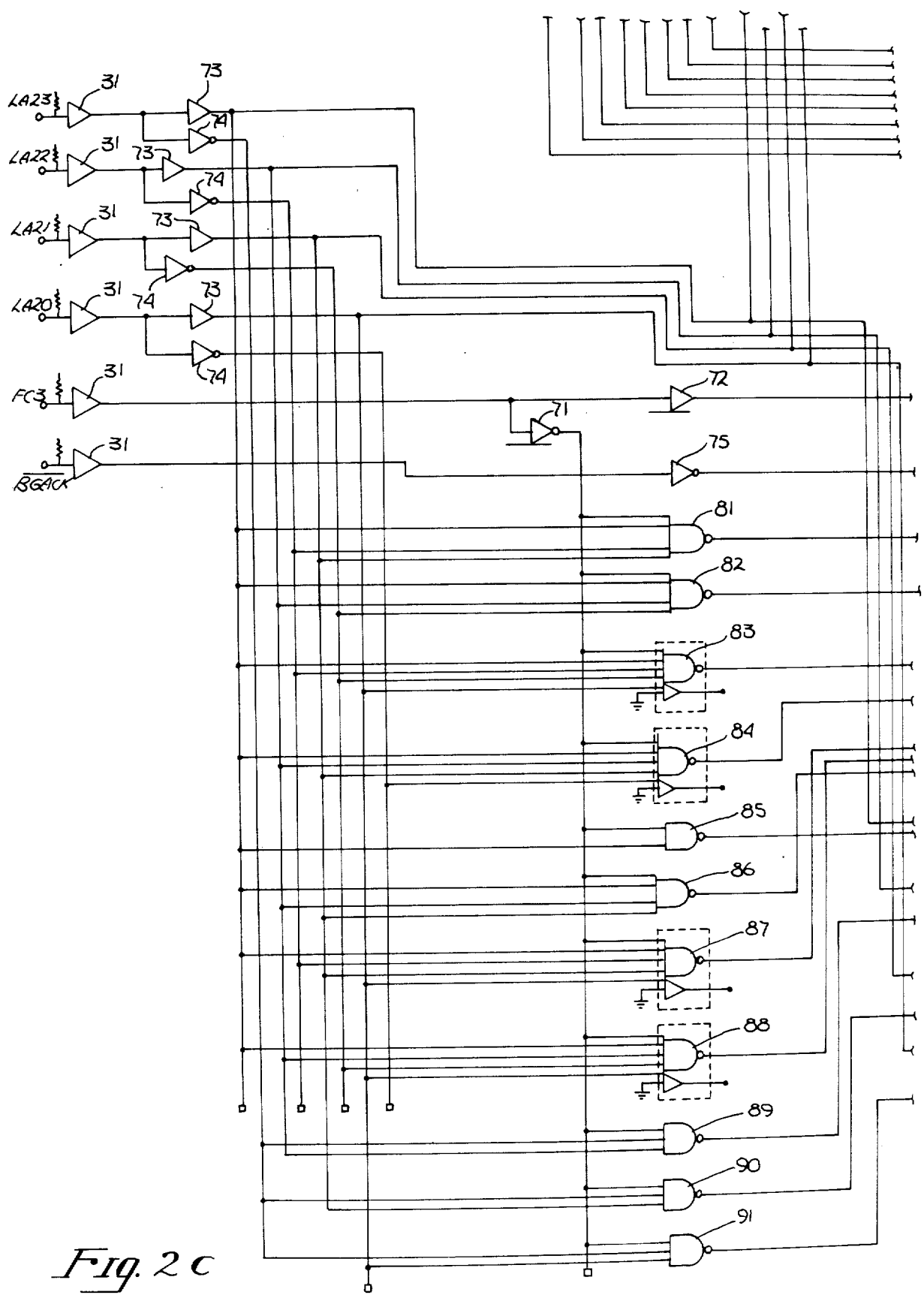
FIG. 2c shows the lower left quadrant of the mapping circuit.
Figure 2D:
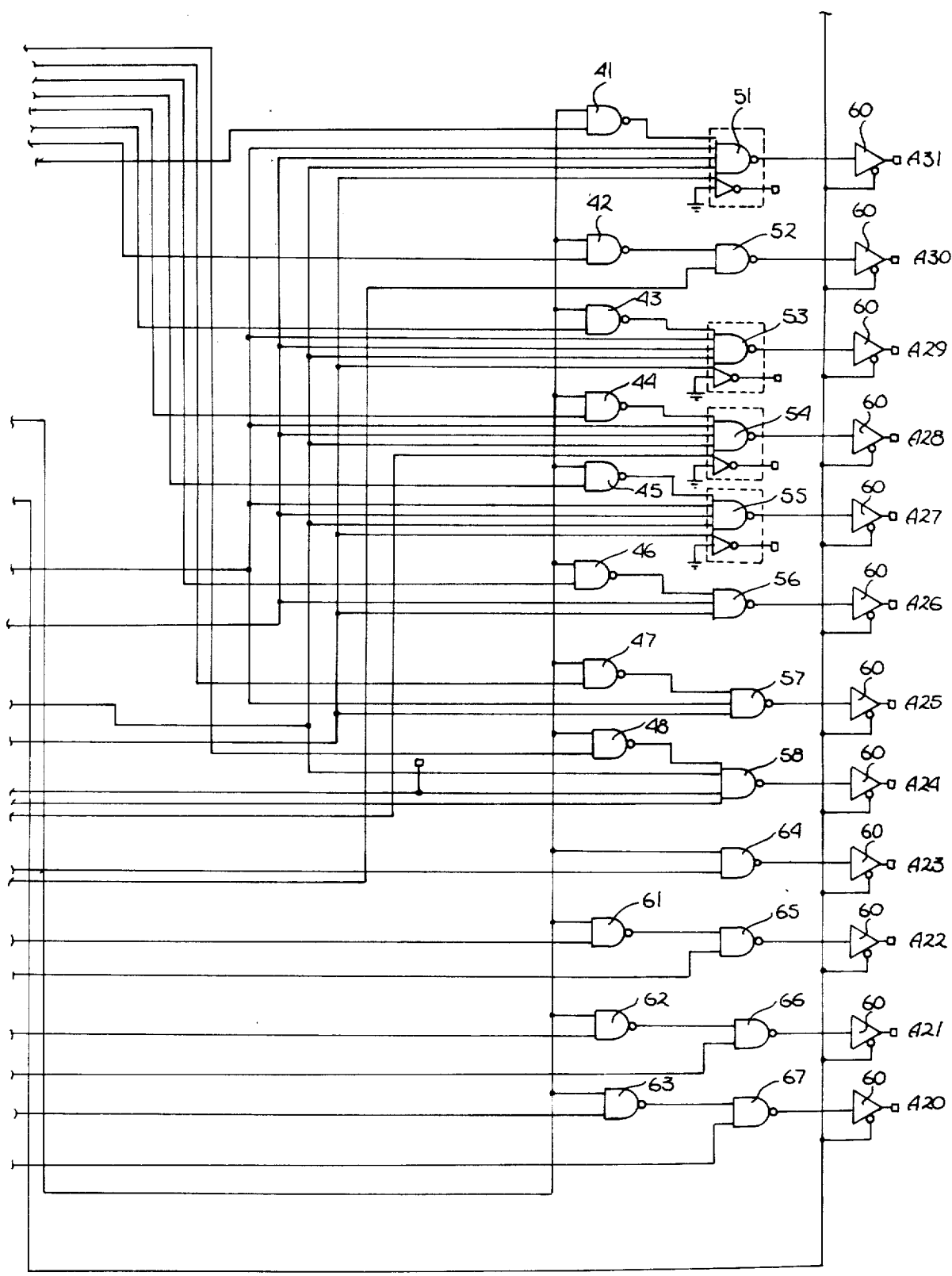
FIG. 2d shows the lower right quadrant of the mapping circuit.

Referring to FIG. 1, the memory mapping scheme of the present invention is shown. A CPU 10 is coupled to access memory 11. A data bus 12 couples the data between CPU 10 and memory 11. The memory 11 is arranged such that it is mapped by a 32-bit address signal from CPU 10. The memory mapping unit (MMU) 15 of the present invention is located to accept logical address signals from CPU 10 and to provide physical address signals to memory 11. The CPU 10 of the preferred embodiment is a Motorola 68020 CPU chip which provides a 32-bit address signals. The eight lower significant bits (LSBs) are passed directly to memory 11 on address bus 16 to provide the 8 LSBs for the physical address signal. The other 24 bits are provided from the CPU 10 as logical address on logical address bus 17.

Bus 17 is coupled to MMU 15, wherein the 24 address bits, LA8–LA31, are split into two paths. Bits LA8–LA19 are directly coupled to provide physical address bits A8–A19 on physical address bus 18. Bits LA14–LA31 are coupled to mapping circuit 20, wherein circuit 20 provides the 12 most significant bits (MSBs) A20–A31 of the physical address signal on bus 18. Although bus 16 and 18 are shown as two separate buses in FIG. 1, in actuality buses 16 and 18 comprise a single 32-bit physical address bus for accessing memory 11. Various other lines are coupled between CPU 10, MMU 15 and memory 11, and are shown by a single line 22 in FIG. 1 for the purpose of simplicity. Clocking signals, function code signals, bus acknowledge signals, strobing signals and other control signals are included as part of line 22.

In operation the lower order 8 bits, A0–A7, are coupled to memory 11 without transitioning through MMU 15. The other 24 address bits from CPU 10 are coupled to MMU 15 on bus 17. Physical address bus 18 provides address bits A8–A31, which when combined with address signals A0–A7 provide the 32 bits needed to access memory 11. When CPU 10 is processing software which was written to provide 32 bits of addressing, circuit 20 will accept LA20–LA31 and pass the 12 bits through to provide address bits A20–A31. Therefore, in the 32-bit mode all 32 bits from the CPU 10, A0–A7 and LA8–LA31, are coupled straight through to memory 11 as physical address signals A0–A31 permitting the CPU 10 to provide the physical address of memory 11.

When executing earlier Macintosh TM computer software, only the 24 LSBs of the 32-bit address field emanating from CPU 10 contain useful information. The 8 MSBs, LA24–LA31, are not relevant to the address field, and hence, are ignored by the MMU 15. The 8 LSBs are generated directly onto bus 16 as address signals A0–A7. The other meaningful address bits, LA8–LA23 are inputted into MMU 15. MMU 15 passes LA8–LA19 directly as before to bus 18 as A8–A19. The MSBs of the 24-bit address, LA20–LA23, are remapped by circuit 20 to provide the 12 physical address signals A20–A31. Therefore, in the 24-bit mode, the lower 20 address bits are passed directly through to memory 11 as address signals A0–A19 and the upper 12 bits from CPU 10 are converted and remapped by circuit 20 to provide address signals A20–A31.

The mapping scheme of mapping a 24-bit address range to a 32-bit address range to access memory 11 as used in the preferred embodiment is shown below:

TABLE 1

| 24 bit address range | | | | 32 bit address range | | | |
|---|---|---|---|---|---|---|---|
| $xx00 | 0000 | $xx7F | FFFF | $0000 | 0000 | $007F | FFFF |
| $xx80 | 0000 | $xx8F | FFFF | $4000 | 0000 | $400F | FFFF |
| $xx90 | 0000 | $xx9F | FFFF | $F900 | 0000 | $F90F | FFFF |
| $xxA0 | 0000 | $xxAF | FFFF | $FA00 | 0000 | $FA0F | FFFF |
| $xxB0 | 0000 | $xxBF | FFFF | $FB00 | 0000 | $FB0F | FFFF |
| $xxC0 | 0000 | $xxCF | FFFF | $FC00 | 0000 | $FC0F | FFFF |
| $xxD0 | 0000 | $xxDF | FFFF | $FD00 | 0000 | $FD0F | FFFF |
| $xxE0 | 0000 | $xxEF | FFFF | $FE00 | 0000 | $FE0F | FFFF |
| $xxF0 | 0000 | $xxFF | FFFF | $5000 | 0000 | $500F | FFFF |

The addresses are shown depicted in hexidecimal code, such that each digit is represented by 4 address bits. For example, a 24-bit address of $90 0000 is converted by the MMU 15 to a 32-bit address $F900 0000. It should be noted that in the remapping scheme the lower five digits, which determine address bits A0–A19 are never changed when remapped to the 32-bit address range. Only the most significant digit (the 4 MSBs) of the 24-bit address is converted to provide bits A20–A31, when remapped to the 32-bit physical address. For example, a 24-bit address of $B0 0000 is converted to a 32-bit address by remapping the digit B to provide the three most significant digits FB0 of the 32-bit address. For an address of $BF FFFF, the digit B is still remapped to digits FB0 to provide a physical address of $FB0F FFFF. An address between $B0 0000 and $BF FFFF is remapped linearly between $FB00 0000 and $FB0F FFFF. The other address ranges are remapped equivalently. In functional terms, circuit 20 when in the 24-bit mode will take the most significant digit of the 24 bit address, LA20–LA23, and generate a new three digit, 12 MSBs, of the 32-bit physical address.

Referring again to Table 1, the remapping scheme of remapping the 24-bit physical address space of the earlier 24-bit software into a 32-bit physical address space is arbitrary and is left to the designer. However, the remapping scheme of the preferred embodiment as shown in Table 1 is designed specifically, such that portions of the memory allotted to a particular task in the earlier version of the Macintosh TM computer is mapped to an equivalent memory space in the memory of the newer computer system using the 32-bit memory address. Obviously, because of the size of memory 11, there will be excess memory space when the 24-bit physical address space is mapped into memory 11. Although a particular addressing scheme using a 24-bit to a 32-bit conversion is described, it is appreciated that oher remapping address schemes, including conversion of other than 24 bits, can be practiced without departing from the spirit and scope of the invention.

Referring to FIGS. 2a–d, a circuit schematic of circuit 20 of FIG. 1 is shown. Various logical address signals LA14–LA31, as well as various control signals, are shown as inputs to input buffers 31. The upper signals LA14–LA19, R/$\overline{W}$, FC0–FC2, $\overline{LAS}$, and clocking signal C16M are utilized to develop $\overline{PAS}$ and $\overline{BERR}$ signals, and are not pertinent to the address conversion provided by the MMU 15. The actual address translation is provided by a portion of the circuit associated with input signals LA20–LA31 and function code signal FC3.

The $\overline{BGACK}$ is a bus acknowledge signal, which is not actually used for ramapping, but is necessary for activating output buffers 60 and 101. A 68020 users manual can be consulted for a precise purpose of the various CPU signals described above. The 24 or the 32-bit mode of the circuit 20 is controlled by the state of signal FC3. Whenver FC3 is low, the MMU 15 operates to transfer the 32 bits from the CPU straight through as physical address to memory 11. Whenever FC3 is high, MMU 15 is in its 24 bit mode and signals LA20–LA23 representing the MSBs of a 24-bit address signal is used to provide a remapped 32-bit address signal.

When in the 32-bit mode, signals LA24–LA31 are coupled to NAND gates 41–48, which outputs are coupled to NAND gates 51–58. The outputs of NAND gates 51–58 are each coupled to its respective tristate output buffers 60. When in the 32-bit mode, FC3 is high, placing a high on second input of each of NAND gates 41–48 such that the outputs of gates 41–48 will be determined by the state of the signals LA24–LA31. FC3 signal is inverted by inverter 71, which output is coupled to an input of various NAND gates 81–91. The output of NAND gates 81-91 are coupled to various input of NAND gates 51-58 and 65-67 as shown in the schematic. Signals LA23-LA20 are coupled through buffer 73 to AND gate 64 and NAND gates 61-63, respectively. In the 32-bit mode, signals LA20-LA31 are coupled through dual NAND gate configuration, such as NAND gates 41 and 51, or through a single AND gate, such as for LA23, wherein the state of the signals LA20-LA31 are unchanged as they are outputted as A20-A31.

The outputs of gates 51-58 and 64-67 are each passed through its respective tristate output buffer 60 to provide address signals A20-A31. Buffers 60 have their tristate enable line coupled to $\overline{BGACK}$ signal through inverter 75. As long as signal $\overline{BGACK}$ remains high, tristate buffers 60 are enabled to provide an output. However, when $\overline{BGACK}$ goes low the tristate buffers 60 are placed in its tristate position and circuit 20 is decoupled from providing address signals on lines A20-A31.

When operating in the 24-bit mode, function code FC3 goes low and a low state is placed on the input of gates 41-48 and 61-64, such that the output of these gates 41-48 and 61-63 remains high and the output of gate 64 remains low causing LA20-LA31 from transitioning to the output A20-A31. Therefore, signals on LA24-LA31 are basically decoupled from passing through circuit 20, due to the operation of gates 41-48 and 61-64. In the 24-bit mode, where bits 24-31 represented by LA24-LA31 are non-functional bits, they are excluded from the operation of the circuit 20.

Signals LA20-LA23, which represent the most significant digit of a 24-bit address and which provide the remapping in the preferred embodiment, are used for the necessary decoding to generate remapped signals A20-A31. Buffer 73s and inverters 74 couple signals LA20-LA23 to corresponding NAND gates 81-91 as shown on the schematic to provide the necessary decoding for the address translation. FC3 is low in this instance such that the output of inverter 71 is at a high state, permitting gates 81-91 to respond to various inputs coupling signals LA20-LA23. Outputs of gates 81-91 are coupled to NAND gates 51-58 and 65-67, wherein further address translation is provided in gates 51-58 such that LA20-LA23 of a 24-bit address signal is converted to provide A20-A31 of a 32-bit physical address signal to address memory 11 of FIG. 1.

It should be pointed out that a single AND gate 64 is used for the generation of address signal A23 in the preferred embodiment, because address signal A23 will be 0 whenever converting 24 bits to 32 bits. This is done in the preferred embodiment because, as can be seen in Table 1, the largest value encountered by the sixth digit during the remapping is a value of 7. However, address line A23 could be implemented using two NAND gates and appropriate decoding as is the case with the other address signals. Therefore, in the 24-bit mode, input lines LA24-LA31 are disregarded and signals LA20-LA23 are used to provide the decoding for generating the most significant 12 bits A20-A31 by gates 81-91, 51-58 and 64-67.

The remaining portion of circuit 20 is not required for the remapping described above, but does take advantage of the 32-bit line from the CPU 10 to provide certain user functions. The twelve input address signals LA20-LA31, as well as address signals LA14-LA19, are coupled through various NOR gates 92 and the output of NOR gates 92 are coupled to a five input NAND gate 93, such that only when all inputs LA14-LA31 are low the output of NAND gate 93 will be low. The output of NAND gate 93 is coupled to an input of NOR gate 94 along with FC2, $\overline{LAS}$ and R/$\overline{W}$ signals, such that whenever signals LA14-LA31 are all low, FC3 is in user mode (low state) and a write is attempted, a bus error signal $\overline{BERR}$ will result at the output of buffer 95.

Flip-flop 96 is a D-type flip-flop coupling the output of NOR gate 94 to buffer 95. Output of NOR gate 94 is coupled through inverter 96 to an input of NAND gate 97, which also has its input an inverted $\overline{LAS}$ signal (LAS), as well as a combination of FC0-FC2 coupled through NAND gate 98. Gate 97 provides an output to a J input of a J-K flip-flop 99. The $\overline{Q}$ output of J-K flip-flop 99 is coupled through inverter 100 and then through buffer 101 to provide a $\overline{PAS}$ signal. Buffer 101 is a tristate buffer, wherein the enable line is coupled to the same enable line as buffers 60. Output of NAND gate 97 sets the J-K flip-flop 99 and provides a low on the $\overline{Q}$ output of the flop-flop 99. The output of NAND gate 97 is also coupled to the K input of flip-flop 99 through inverter 102 to reset flip-flop 99. Clock signal C16M is coupled to clock inputs of flip-flop 99 and 96 for sychronizing these two flip-flops. The purpose of flip-flop 99 is to simply convert the $\overline{LAS}$ signal to a PAS signal at the output of buffer 101.

As stated earlier the upper portion of circuit 20 is nonmaterial to the operation of the address translation of converting 24-bit address space into a 32-bit address space. Further, circuit 20 of the preferred embodiment is structured using known gate array techniques, such that circuit 20 is embodied in a single semiconductor chip. However, other configurations and techniques, not necessarily gate arrays, can be used to provide the address translation of the present invention without departing from the spirit and scope of the present invention. Also, circuit 20 shows other components, such as pull-up resistors associated with buffers 31, unused inverters (shown within the dotted lines associated with gates, such as gate 51), and pads for coupling various signals to and from the chip, but these features are well-known in the art and do not add to the teaching of the present invention.

Thus, a memory mapping unit for a computer is described.

We claim:

1. In a computer system which includes a central processing unit (CPU) for operating on programs of varying bit length addressing fields, a computer main memory, and a memory mapping unit (MMU), said MMU coupled to said CPU and said main memory, said MMU comprising:

input means coupled to accept a CPU address signal from said CPU;

output means coupled to provide a physical address signal to address said main memory;

decoding means coupled to said input means and said output means for translating said CPU address signal;

switching means coupled to said input means and said decoding means for switching in said decoding means, wherein during a first mode said CPU address signal has a first bit length address field and is passed through to provide said physical address signal and during a second mode said decoding means is switched in to convert said CPU address signal which has a second bit length address field to said physical address signal;

wherein two equivalent program instructions, but each having different bit length address fields, access identical areas of said memory.

2. The MMU defined in claim 1, wherein a portion of said CPU address signal is coupled to said decoding means and said portion of said CPU address signal is processed by said decoding means to provide said physical address signal.

3. The MMU defined in claim 2, wherein said portion of said CPU address signal is processed to provide a portion of said physical address signal.

4. The MMU defined in claim 3, wherein said decoding means further including a plurality of gates to provide combinatorial logic for processing said CPU address signal.

5. The MMU defined in claim 4 being implemented in a gate-array semiconductor chip.

6. In a computer system which includes a CPU for operating on a program which provides a CPU address signal having a first bit length field and also operating on another program which provides said CPU address signal having a second bit length field which length is shorter than said first bit length field, a computer main memory being accessed by a physical address signal having said first bit length field, and a memory mapping unit (MMU) coupled to said CPU and said main memory for accepting said CPU address signal and providing said physical address signal, sand MMU comprising:

input means coupled to accept said CPU address signal from said CPU;

output means coupled to provide said physical address signal to address said main memory;

decoding means coupled to said input means and said output means for translating said second bit length field to said first bit length field;

switching means coupled to said input means and said decoding means and under control of a control signal from said CPU; wherein during a first mode said CPU address signal, having a first bit lenght field, is passed through to provide said physical address; and during a second mode when said CPU is providing a second bit length field, said decoding means is switched in to convert said second bit length field to said first bit length field, which is then used as said physical address signal to access said memory;

wherein remapping of said CPU address signal is achieved during said second mode.

7. The MMU defined in claim 6, wherein during said second mode, a portion of said second bit length field is processed by said decoding means to provide said physical address signal.

8. The MMU defined in claim 7, wherein said decoding means including a set of gate-arrayed combinatorial logic.

9. The MMU defined in claim 8, wherein said switching means including a second set of gate-arrayed combinatorial logic.

10. The MMU defined in claim 9 being implemented in a semiconductor chip.

11. In a computer system which includes a CPU for generating a 32-bit CPU address signal, a computer main memory being accessed by a 32-bit physical address signal, and a Memory Mapping Unit (MMU) coupled to said CPU and said main memory for accepting said CPU address signal and providing said physical address signal, said CPU for operating programs generating either a 32-bit address or a 24-bit address, said MMU comprising;

input means coupled to accept said CPU address signal;

output means coupled to provide said physical address signal to address said main memory;

decoding means coupled to said input means and said output means for translating a 24-bit CPU address signal to a 32-bit physical address signal;

switching means coupled to said input means and said decoding means for switching in said decoding means under control of a control signal from said CPU; wherein during a first mode a 32-bit CPU address signal is passed through to provide said physical address and during a second mode said decoding means is switched in to convert said 24-bit CPU address to said 32-bit physical address;

wherein a 24-bit physical memory space is mapped into a 32-bit physical memory space during said second mode.

12. The MMU defined in claim 11, wherein twelve most significant bits (MSBs) of said 32-bit CPU signal are processed by said MMU and twenty least significant bits (LSBs) of said 32-bit CPU signal are coupled directly to provide twenty LSBs of said physical address signal.

13. The MMU defined in claim 12, wherein said 12 MSBs are passed through to provide 12 MSBs of said physical address signal during said first mode; but during said second mode, only four bits of said 12 MSBs contain address information and said four bits are processed by said decoding means to generate a remapped 12 MSBs of said physical address signal.

14. The MMU defined in claim 13, wherein said decoding means is comprised of combinatorial logic formed using gate-array technology.

15. The MMU defined in claim 14, wherein said switching means is comprised of combinatorial logic formed using gate-array technology.

16. The MMU defined in claim 15 being implemented in a semiconductor chip.

* * * * *